US007003657B2

(12) United States Patent
Nelson et al.

(10) Patent No.: US 7,003,657 B2
(45) **Date of Patent: *Feb. 21, 2006**

(54) APPARATUS AND METHOD FOR CONFIGURATION OF AN ELECTRONIC DEVICE USING A SCANNED CONFIGURATION SHEET

(75) Inventors: Marvin Duane Nelson, Meridian, ID (US); Terry James Garrison, Boise, ID (US); Vincent C. Skurdal, Boise, ID (US); Mark Louis Brown, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 590 days.

This patent is subject to a terminal disclaimer.

(21) Appl. No.: 10/177,464

(22) Filed: Jun. 21, 2002

(65) Prior Publication Data

US 2003/0236973 A1 Dec. 25, 2003

(51) Int. Cl.
*G06F 15/77* (2006.01)

(52) U.S. Cl. .......................... 713/1; 235/454; 235/375

(58) Field of Classification Search ..................... 713/1
See application file for complete search history.

(56) References Cited

U.S. PATENT DOCUMENTS

| | | | | |
|---|---|---|---|---|
| 4,782,221 | A | 11/1988 | Brass et al. | |
| 4,894,778 | A * | 1/1990 | Matsumura | 378/15 |
| 4,937,439 | A | 6/1990 | Wanninger et al. | |
| 5,004,896 | A | 4/1991 | Serrell et al. | |
| 5,085,587 | A | 2/1992 | DesForges et al. | |
| 5,204,515 | A | 4/1993 | Yoshida | |
| 5,337,362 | A | 8/1994 | Gormish et al. | |
| 5,430,793 | A | 7/1995 | Ueltzen et al. | |
| 5,484,999 | A | 1/1996 | Priddy et al. | |
| 5,712,977 | A | 1/1998 | Glad et al. | |
| 5,726,435 | A | 3/1998 | Hara et al. | |
| 5,837,986 | A | 11/1998 | Barile et al. | |
| 5,940,627 | A | 8/1999 | Luciani et al. | |
| 5,960,167 | A | 9/1999 | Roberts et al. | |
| 6,031,455 | A * | 2/2000 | Grube et al. | 340/539.26 |
| 6,222,638 | B1 | 4/2001 | Otala | |
| 6,312,106 | B1 | 11/2001 | Walker | |
| 6,410,941 | B1 * | 6/2002 | Taylor et al. | 257/84 |
| 6,758,391 | B1 * | 7/2004 | Pickens, III | 235/375 |
| 6,771,820 | B1 * | 8/2004 | Oakeson | 382/232 |
| 6,854,650 | B1 * | 2/2005 | Hattersley et al. | 235/454 |
| 2001/0019343 | A1 | 9/2001 | Walker et al. | |

FOREIGN PATENT DOCUMENTS

| | | |
|---|---|---|
| EP | 1178393 | 6/2002 |

OTHER PUBLICATIONS

Mechanism to Automate National Language Configuration. IBM Technical Disclosure Bulletin 93A 62380// DA8920750, vol. 36, Pub. No. 9B. Also available on website: http://www.delphion.com/tdbs/tdt?order=93A+62380 (2 pages).

* cited by examiner

*Primary Examiner*—A. Elamin
*Assistant Examiner*—Anand B. Patel

(57) ABSTRACT

An electronic device includes a scanning device for converting one or more configuration symbols on a printed medium into scan data. The scanning device is capable of scanning a configuration sheet and creating the scan data, including the one or more configuration symbols. The electronic device further includes a configuration device that receives the scan data and is capable of extracting the one or more configuration symbols to create one or more corresponding address-independent configuration values. The configuration device is further capable of configuring the electronic device with the one or more address-independent configuration values.

56 Claims, 6 Drawing Sheets

APPARATUS AND METHOD FOR CONFIGURATION OF AN ELECTRONIC DEVICE USING A SCANNED CONFIGURATION SHEET

FIELD OF THE INVENTION

The present invention relates generally to configuration settings of an electronic device.

BACKGROUND OF THE INVENTION

Due to the global economy, electronic devices may be manufactured in a facility in a particular country and then shipped to destinations around the world. This provides economies of scale, as a single manufacturing facility can be optimized to produce large quantities of a device. Shipping may be cheaper than constructing manufacturing facilities in numerous countries.

However, this manufacturing scheme has a drawback in that there is a need to configure such devices differently for each destination. For example, a printer shipped to Europe may require different settings than a printer shipped to the United States. The configuration may depend on the language of the region, the fonts needed for the language, a communication protocol used in the region, a standard paper size used in the region, etc.

In one prior art approach to configuration, a configuration process is performed at the factory by the manufacturer. This may include electronically downloading data into the memory of the device.

However, this prior art approach has several drawbacks. It is inflexible and delays shipping. It is time-consuming for a worker at a local distribution center or other geographic site to un-box, connect, configure, and re-package each electronic device. In addition, it requires accurate forecasting of future product distribution, and missing a predicted target of number of units to be shipped to a region incurs extra cost and requires extra handling. Most of all, it is relatively expensive and requires a significant amount of man-hours to perform.

In another prior art approach, the manufacturer provides multiple configuration data sets in a memory of the electronic device. Therefore, the user may configure the electronic device by selecting an appropriate data set or sets.

A drawback to this prior art approach is that the cost of the excess (and unused) memory is a significant addition to the purchase price. In addition, the set-up may be difficult and time-consuming for the purchaser, especially if the purchaser is not knowledgeable about the particular device. Moreover, the user interface (such as a printer control panel, for example) may offer very limited configuration ability, i.e., no large display screen for displaying instructions, menus, choices, diagrams, etc. for the benefit of the person configuring the electronic device. The very limited configuration ability of the prior art makes the configuration process very convoluted.

In yet another prior art approach, the purchaser is left to program the device and enter any needed settings. This has obvious drawbacks in that the set-up may be difficult and time-consuming for the purchaser to perform, especially if the purchaser is not proficient in using the particular electronic device. In addition, the user interface of the electronic device may offer limited configuration ability. Moreover, for an electronic device that is used by multiple users (such as in an institutional setting), configuring and re-configuring an electronic device may be too difficult and time-consuming.

The user may likely require special training and documentation, and may still be error-prone and frustrated due to the length and complexity of the configuration process. Furthermore, in an institutional setting where more than one electronic device is purchased at one time, the man-hours required to set up multiple electronic devices may be very costly. Consequently, a fast and efficient way to configure a large number of devices is highly desirable.

Therefore, there remains a need in the art for improvements in the configuration of an electronic device.

SUMMARY OF THE INVENTION

An electronic device comprises a scanning device for converting one or more configuration symbols on a printed medium into scan data. The scanning device is capable of scanning a configuration sheet and creating the scan data, including the one or more configuration symbols. The electronic device further comprises a configuration device that receives the scan data and is capable of extracting the one or more configuration symbols to create one or more corresponding address-independent configuration values. The configuration device is further capable of configuring the electronic device with the one or more address-independent configuration values.

DETAILED DESCRIPTION

Figure 1:
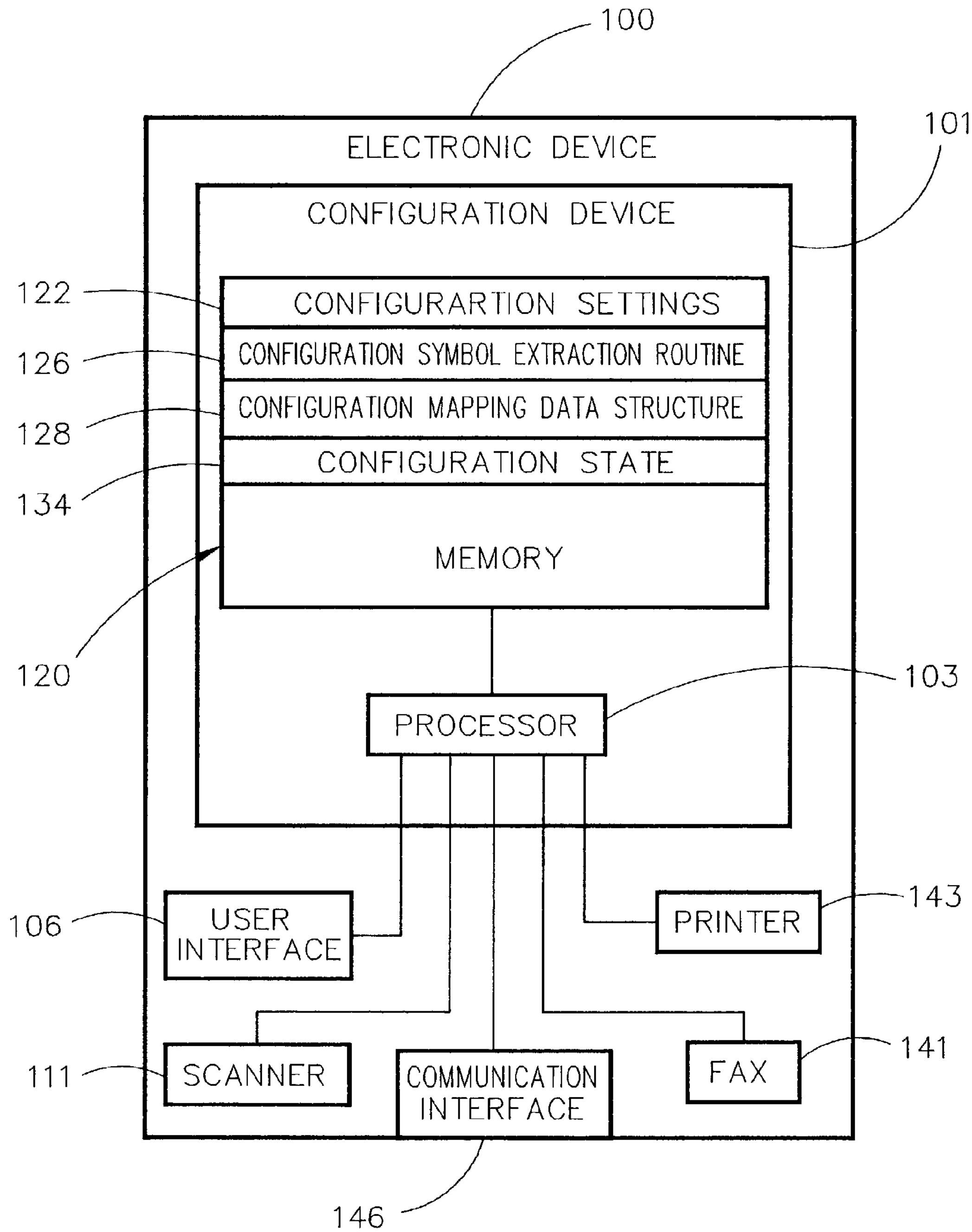
FIG. 1 is a block diagram of an electronic device according to one embodiment of the invention.

FIG. 1 is a block diagram of an electronic device 100 according to one embodiment of the invention. The electronic device 100 includes a scanner 111 and a configuration device 101. In addition, the electronic device 100 may include a user interface 106, a communications interface 146, a facsimile (fax) 141, and a printer 143. The configuration device 101 may further comprise a memory 120 and a processor 103 that operates in conjunction with the memory 120 in order to configure the electronic device 100. The electronic device 100 may be, for example, a combination scanner/printer, a combination fax/scanner/printer, a copier, a combination copier/scanner/fax/printer, etc.

The scanner 111 may be an integral component of the electronic device 100 or may be connected to and in communication with the electronic device 100. The scanner 111 may be a flatbed scanner, a portable scanner, a sheet-feed scanner including an automatic document feeder, etc. The scanner 111 scans a printed medium, such as a sheet of paper bearing printed symbols and characters, and generates a digital representation thereof in the form of scan data. The configuration device 101 receives the scan data from the scanner 111, extracts configuration information (such as configuration symbols), and configures the electronic device 100 according to the configuration information born by the printed medium.

The user interface 106 may accept user inputs and may generate visual outputs to the user. The user interface 106 may include a keyboard or keypad, various input buttons and switches, etc. In addition, the user interface 106 may include a display screen such as a cathode ray tube (CRT) display, a liquid crystal display (LCD), a light emitting diode (LED) display, etc. Alternatively, the user interface 106 may include a touch screen that accomplishes both input and output functions.

The facsimile 141 is an optional component that may perform typical facsimile functions. The facsimile 141 may be used for transmitting outgoing faxes and receiving incoming faxes.

The printer 143 is another optional component. The printer 143 may be an integral component of the electronic device 100, or may be connected to and in communication with the electronic device 100. The printer 143 may generate normal printed output. In addition, the printer 143 may be used to print any configuration sheets that are stored in the memory 120 (not shown).

The communication interface 146 may be any type of digital communication interface, such as a modem, a computer network card, a wireless interface, etc. The communication interface 146 enables digital communication between the electronic device 100 and other electronic devices. For example, the communication interface 146 may allow the electronic device 100 to communicate over any manner of digital network, such as a local area network (LAN), a wide-area network (WAN), the Internet, etc.

The processor 103 may be any type of general purpose processor. The processor 103 executes a control routine contained in the memory 120. In addition, the processor 103 receives inputs and controls operations of the electronic device 100.

The memory 120 may be any type of digital memory. The memory 120 may store, among other things, configuration settings 122, a configuration symbol extraction routine 126, a configuration mapping data structure 128, and a configuration state 134. In addition, the memory 120 may store software or firmware to be executed by the processor 103.

The configuration settings 122 control at least some of the operations of the electronic device 100. The configuration settings 122 may include a default paper/page size (i.e., 8½×11 paper, A4 paper, etc.), a language (to be used on the display portion of the user interface 106 or on printed information), language specific translations, fonts (to be used on the display or in printed information), country-specific fax parameters (such as, for example, a telephony protocol, a ring frequency, a maximum/minimum number of rings, or a complex versus simple impedance), Uniform Resource Locators (URLs), support telephone numbers (such as a telephone number of a regional service center, for example), etc. Other configuration values may be included, and the listing above is not exhaustive. In some countries, these fax settings must be properly configured before the device can be legally connected to telephone lines. Therefore, it is imperative that the electronic device 100 be properly configured before it is operated.

The configuration settings 122 may configure the language of the electronic device 100. For example, the configuration settings 122 may contain scanned configuration data that chooses a language to be printed by the electronic device 100. Furthermore, the configuration settings may include data that is used by the electronic device 100 for translating data into the chosen language. This may include, for example, translating data for display on a screen of the user interface 106.

The configuration settings 122 may configure the fonts of the electronic device 100. For example, the configuration settings 122 may contain scanned configuration data that chooses one or more sets of fonts to be used by the electronic device 100. Furthermore, the configuration settings may include data that is used by the electronic device 100 for choosing treatments for the chosen fonts. This may include, for example, treatments that specify bold fonts, fonts in italics, that feet or other embellishments be added to the fonts, etc.

The configuration symbol extraction routine 126 may be a software routine that locates and extracts configuration symbols 206 from a scanned configuration sheet 200 (see FIG. 2) in order to configure the electronic device 100. The configuration symbol extraction routine 126 may use the configuration mapping data structure 128 to achieve the locating and extracting operations (see FIG. 3 and the accompanying discussion below).

The configuration mapping data structure 128 maps configuration symbols 206 to corresponding configuration settings, i.e., a configuration symbol 206 may be mapped to a particular configuration setting, such as a language setting, for example. Therefore, the extracting may comprise mapping a configuration symbol 206 to one or more configuration values.

The configuration state 134 is a variable that indicates whether the electronic device 100 has been already configured. For example, the configuration process may be performed and the configuration state 134 may be set when the electronic device 100 is first unboxed and powered-up. Alternatively, the configuration process may occur at a later time. In one embodiment, the configuration state 134 may be set to zero at the factory, and set to a non-zero value when the electronic device 100 is configured.

In operation, the user selects all appropriate configuration sheets 200. Through configuration sheet selection, the user selects desired settings and configuration values of the electronic device 100. The user then scans the selected sheet or sheets into the electronic device 100, using the scanner 111. The electronic device 100 extracts configuration symbols from the scanned configuration sheet using the configuration symbol extraction routine 126 and the configuration mapping data structure 128 in order to obtain configuration values. The extracted configuration values are loaded into the configuration settings 122 of the memory 120, therefore configuring or re-configuring the electronic device 100. The configuration may be performed when the device is first purchased and set-up and may additionally be done at any later time as needed. This process allows manufacturing to include only the needed configuration sheets to the outside of the box or just inside the cover, thus avoiding the unboxing process. In addition, the invention allows the end user to complete the required configuration steps. Moreover, the configuration sheets may additionally include localized instructions (in the proper language) about how to perform the configuration steps.

Figure 2:
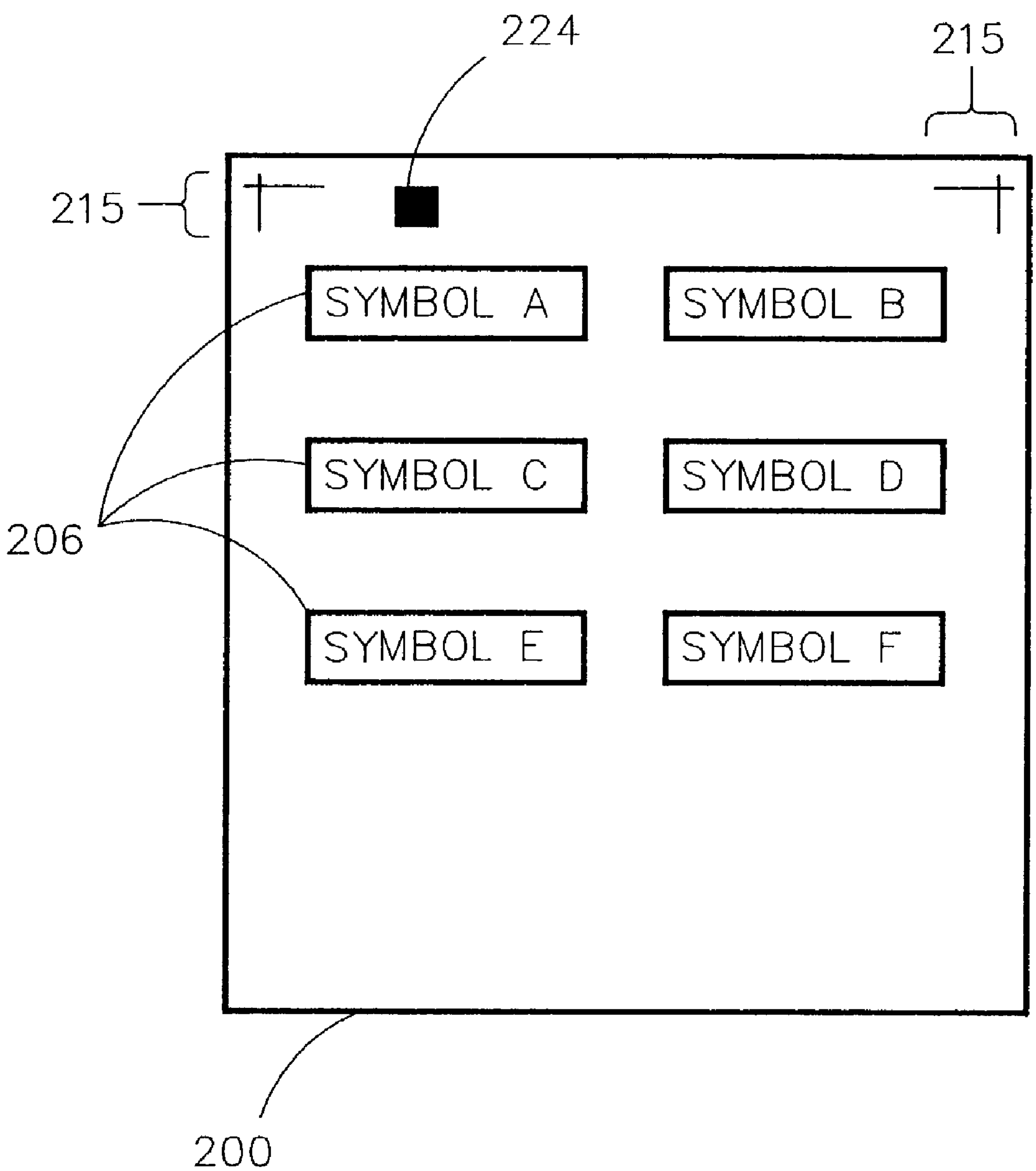
FIG. 2 is a diagram of a configuration sheet according to another embodiment of the invention.

FIG. 2 is a diagram of a configuration sheet 200 according to another embodiment of the invention. The configuration sheet 200 includes one or more configuration symbols 206 and may further include one or more alignment marks 215 and one or more identification marks 224.

The configuration sheet 200 may be any type of printed medium that is capable of being scanned, such as a paper sheet, for example. The printed medium may be of any needed size, including common paper sizes such as 8½×11 inches.

A configuration symbol 206 may be formed or printed at a predetermined location on the configuration sheet 200. The configuration symbol 206 may be of any shape or size, including solid or outline symbols. A particular configuration symbol 206 may include corresponding text and/or graphics that describe one or more configuration options, values, or settings for that particular configuration symbol 206.

A configuration sheet 200 may include encoded and compressed information which has been printed on high quality paper to produce a densely encoded information page, with the configuration information therefore being stored on the paper. This may be accomplished, for example, using patterns of black and white pixels that can be read by the scanner 111. When an encoded and compressed configuration sheet 200 is scanned, the electronic device 100 acquires the pixel pattern and extracts, decodes, and decompresses the address-independent configuration values. As a result, large amounts of configuration information may be stored on a single sheet of a printed medium, such as up to one megabyte of information or more per page, for example.

In one embodiment, a configuration sheet 200 may include configuration symbols 206 that specify one or more paper sizes. For example, for European markets, the electronic device 100 may need to include an A4 (European) paper size which may or may not need to be included if the electronic device 100 is to be used in the United States.

In another embodiment, the shape of a particular configuration symbol 206 may correspond in some manner to the configuration data type, i.e., a paper size setting configuration symbol 206 may be rectangular, while a fax setting configuration symbol 206 may be a phone outline, for example. Alternatively, the location of a particular configuration symbol 206 may be used to obtain one or more configuration values corresponding to the particular configuration symbol 206. For example, the extracting process may compare an (x,y) location of a particular configuration symbol 206 to a table. The extracting process may find a positional match in the table and therefore may readout a corresponding configuration value or values (see FIG. 3 below).

The one or more alignment marks 215 may be included in one or more corner regions of the configuration sheet 200. In one embodiment, a configuration sheet 200 includes four alignment marks 215, one in each corner. The one or more alignment marks 215 may align and register the configuration sheet 200. In one embodiment, the alignment mark 215 is asymmetrical, and therefore can be used by the electronic device 100 to determine the amount of paper skew, the amount of paper deformation, and the amount of image stretch due to the characteristics of the scanner 111 (such as an unexpected end of paper, for example). These determinations are helpful in locating and extracting the configuration symbols 206. In addition, the shape and asymmetry of the one or more alignment marks 215 may be discriminated from a line border printed on the configuration sheet 200.

The one or more alignment marks 215 may optionally identify a scanned configuration sheet 200 and additionally may identify a sheet in a series of multiple sheets (if multiple sheets exist). By identifying a particular sheet, the electronic device 100 can determine the configuration values born by the particular sheet.

In an alternative embodiment, the one or more identification marks 224, alone or in conjunction with the one or more alignment marks 215, may identify a particular configuration sheet 200, such as when a sheet is one of a series of sheets. In addition, the one or more identification marks 224 and the one or more alignment marks 215 may enable auto-detection of a configuration sheet 200. The one or more identification marks 224 may comprise one or more identifying characters or symbols, such as the solid rectangle shown. It should be understood that any manner of characters or symbols may be used, and the single rectangle shown is merely for purposes of illustration and is not limiting.

In one embodiment, the configuration symbols 206, the one or more alignment marks 215, and the one or more identification marks 224 may all be formed on one side of a printed medium. In an alternative embodiment, the configuration sheet 220 may include alignment marks 215 and identification marks 224 on both sides of the printed medium. In another alternative embodiment, the configuration symbols 206 may also be printed on both sides of the printed medium to form a double-sided configuration sheet 200.

Figure 3:
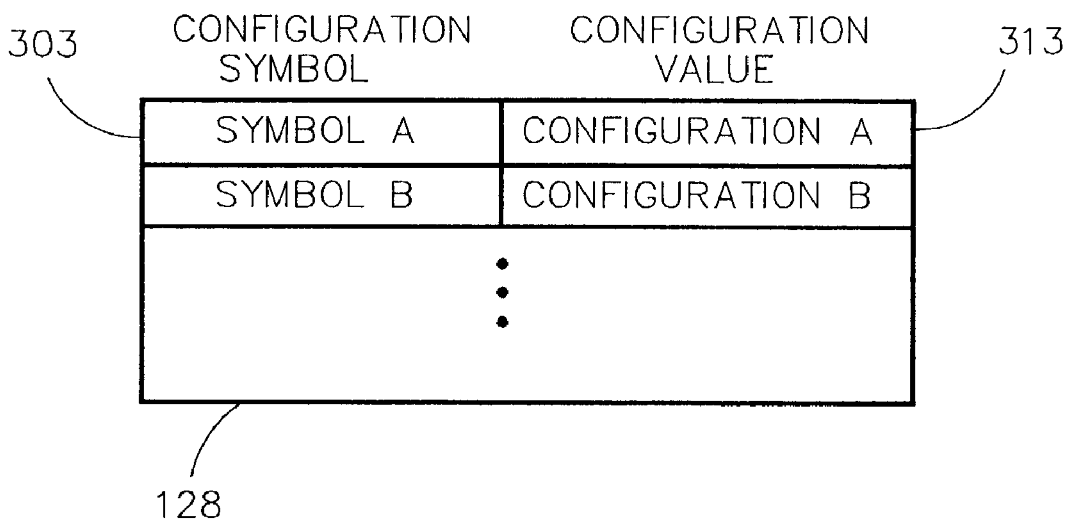
FIG. 3 is a diagram of a configuration mapping data structure according to yet another embodiment of the invention.

FIG. 3 is a diagram of a configuration mapping data structure 128 according to yet another embodiment of the invention. The configuration mapping structure 128 in this embodiment is a table that maps a physical location, such as an (x, y) location of a configuration symbol 206, to a corresponding configuration value or values. Alternatively, the configuration mapping data structure 128 may map a shape, size, or other symbol characteristics to a corresponding configuration symbol 206. In the example shown, the location, shape, etc., of the configuration symbol B (see FIG. 2) is matched to the location entry 303. The location entry 303 generates a configuration value 313, i.e., it generates an output of configuration B data.

Figure 4:
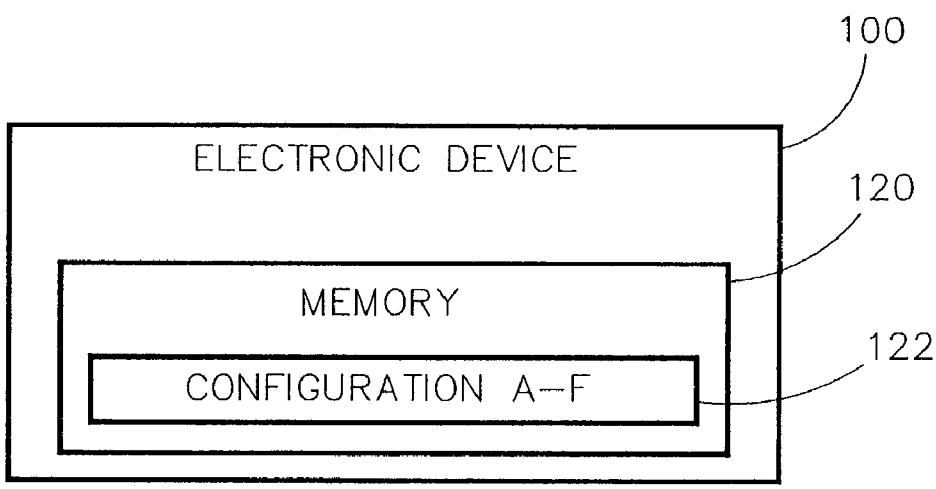
FIG. 4 is a block diagram of the electronic device wherein a configuration sheet, including configuration symbols A–F, has been selected and scanned.

FIG. 4 is a block diagram of the electronic device 100 wherein a configuration sheet 200, including configuration symbols A–F, has been selected and scanned. As a result, the electronic device 100 has configuration data A–F loaded into the memory 120, with the configuration data A–F therefore configuring the electronic device 100.

Figure 5:
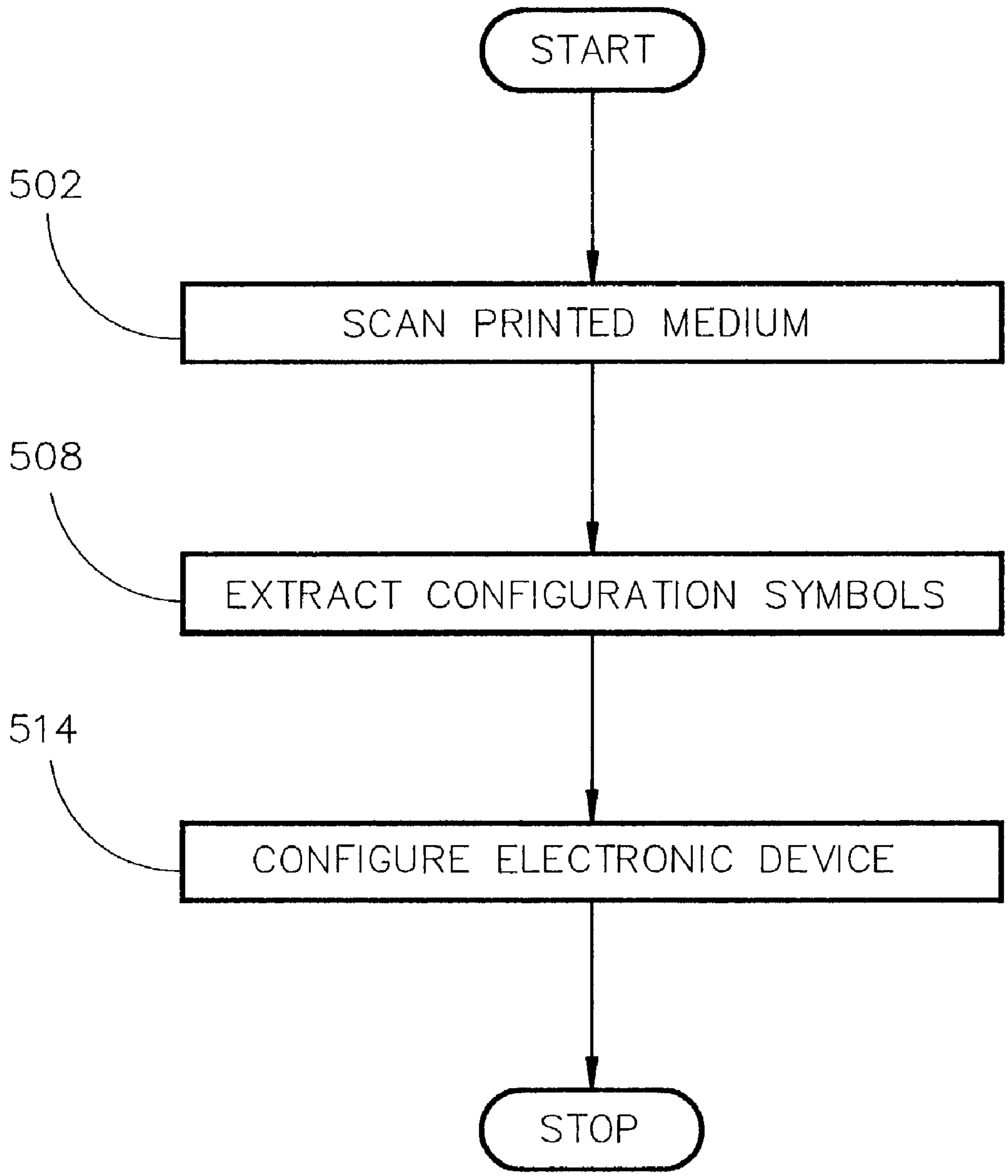
FIG. 5 illustrates, in flowchart form, the operations performed by another embodiment of the invention.

FIG. 5 illustrates, in flowchart form, the operations performed by another embodiment of the invention. In block 502, a configuration sheet or sheets 200 (in the form of a printed medium) are scanned into the electronic device 100. Each sheet includes one or more configuration symbols 206. The scanning may be done by an integral or connected scanner 111. The scanning creates scan data that is a digital representation of the configuration sheet or sheets 200. The scan may be in response to a detected initial power-up of the electronic device 100, for example.

In block 508, the scan data is extracted, as previously discussed. The extracting process creates one or more configuration values from the scanned configuration symbols 206.

In block 514, the electronic device is configured according to the extracted configuration values. A configuration value may be any of the variables previously discussed, or may include additional ones. For example, the configuring may include a regionalization process wherein regional values or settings are loaded into the electronic device 100.

Figure 6:
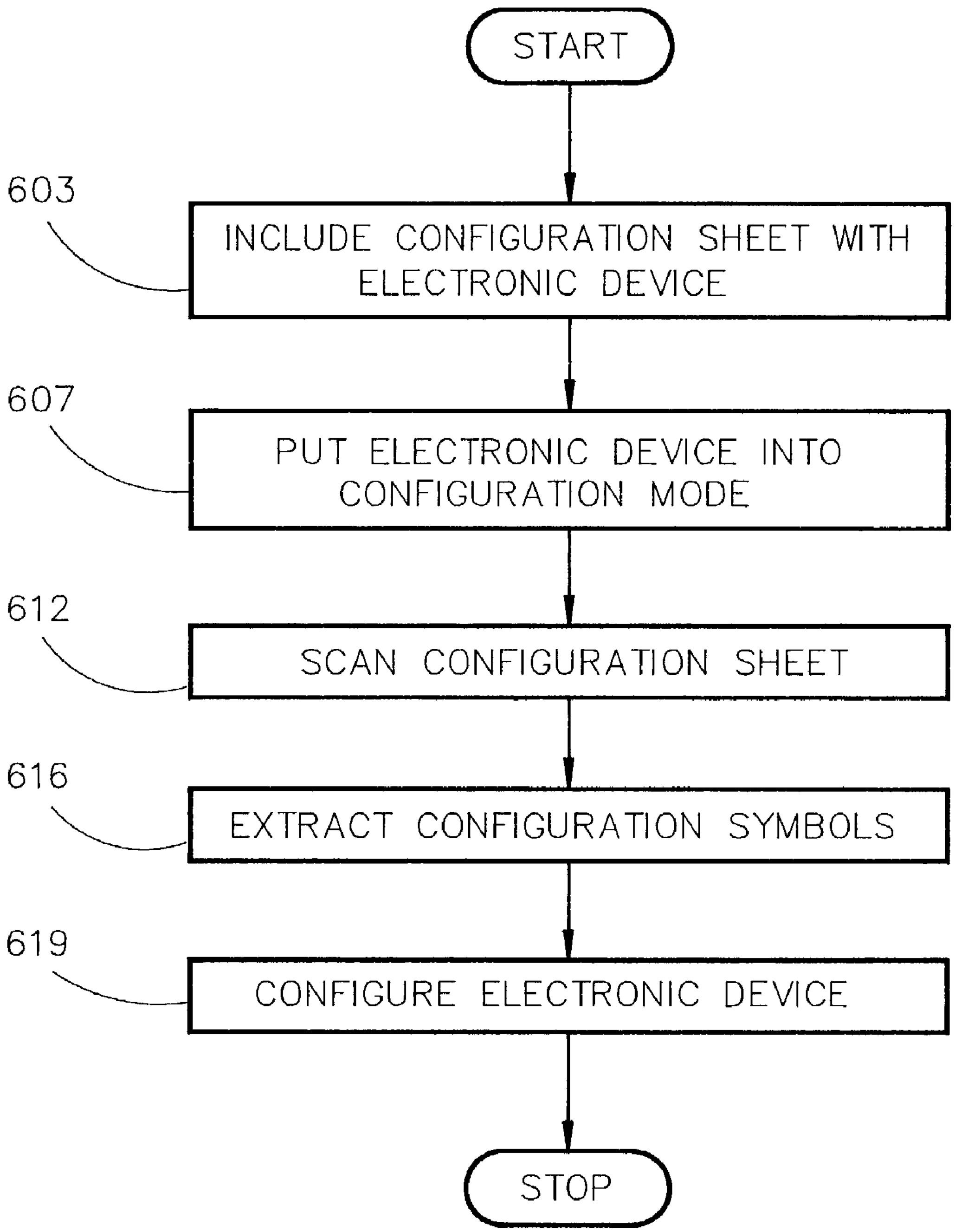
FIG. 6 illustrates, in flowchart form, the operations performed by yet another embodiment of the invention.

FIG. 6 illustrates, in flowchart form, the operations performed by yet another embodiment of the invention. In block 603, one or more configuration sheets 200 may be included within or on an exterior of a shipping carton of the electronic device 100. Alternatively, one or more appropriate configuration sheets 200 may be stored in the memory 120 of the electronic device 100 and may be printed out by a user. The printout may be automatically performed by the electronic device 100 upon a first power-up. Alternatively, the printout may be initiated by the user.

In block 607, the electronic device 100 is put into a configuration mode. This may occur automatically at a first power-up of the electronic device 100. For example, at each power-up, the electronic device 100 may determine whether it is configured by checking the configuration state 134, and may determine that a first power-up has occurred if the device is not configured. Alternatively, when the electronic device 100 is powered up and a print count is a predetermined number, a first power-up may be determined to have occurred. In another alternative, a user of the electronic device 100 may manually put the electronic device 100 into the configuration mode, such as through appropriate manipulation of the user interface 106.

Alternatively, the electronic device 100 may automatically place itself into the configuration mode. This may be accomplished by auto-detecting a configuration sheet 200 using the one or more alignment marks 215 and/or the one or more identification marks 224. Therefore, in this embodiment each scanned sheet is checked to see if it is a configuration sheet 200.

In block 612, the configuration sheet or sheets 200 are scanned into the electronic device 100, as previously discussed.

In block 616, configuration symbols are extracted, as previously discussed.

In block 619, the electronic device is configured according to the extracted configuration values, as previously discussed.

Figure 7:
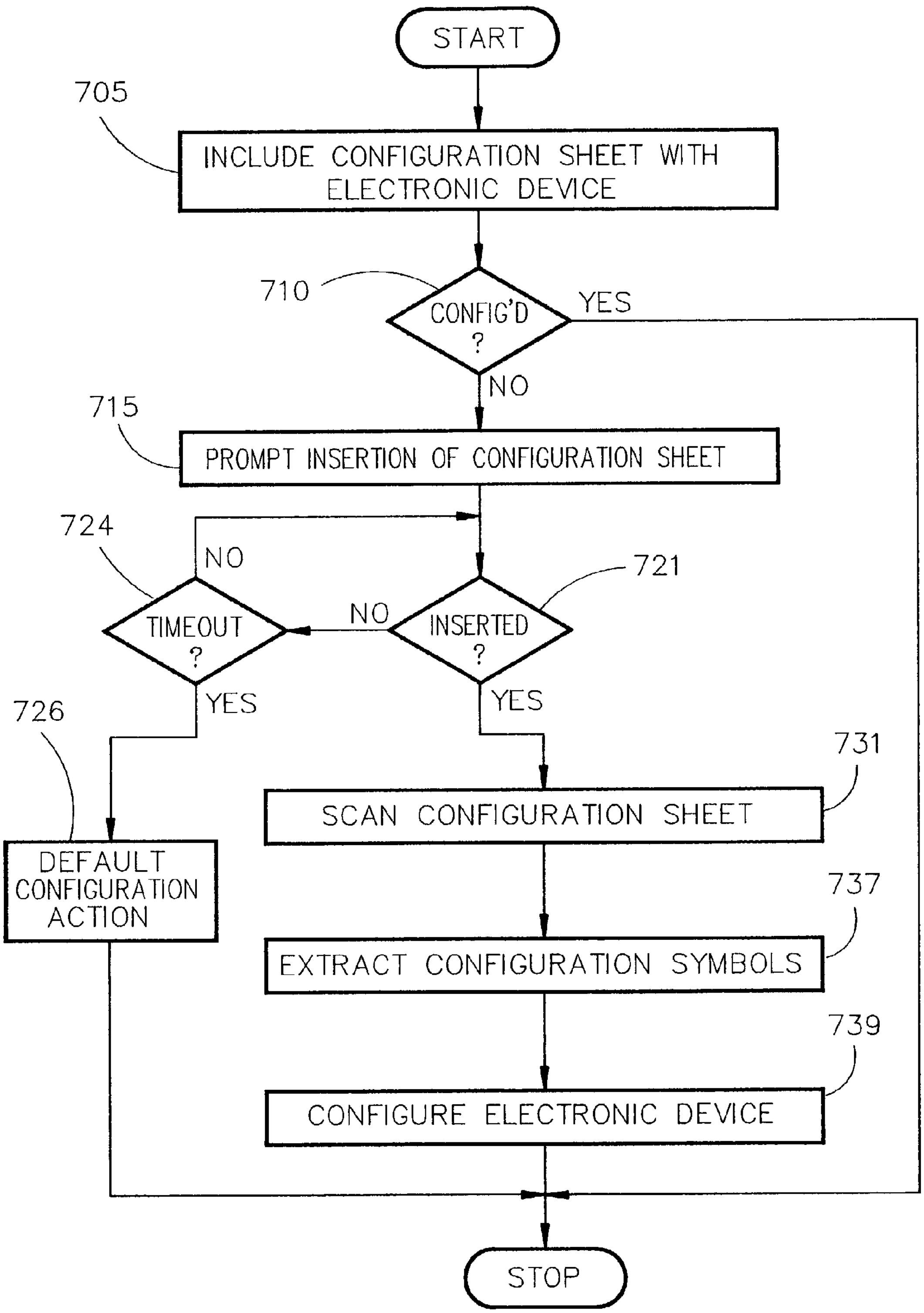
FIG. 7 illustrates, in flowchart form, the operations performed by yet another embodiment of the invention.

FIG. 7 illustrates, in flowchart form, the operations performed by yet another embodiment of the invention. In this embodiment, the configuration of the electronic device 100 is a pull process, wherein the configuration is initiated by the electronic device 100 and the user merely inserts and scans a set of configuration sheets 200 at the prompting of the electronic device 100. As a result, even an unsophisticated user can easily and successfully configure the electronic device 100.

In block 705, one or more configuration sheets 200 are included with the electronic device 100, as previously discussed.

In decision block 710, the electronic device 100 checks to see whether it is in the configuration mode. This may include checking the configuration state 134 to see if the configuration state 134 contains an unconfigured state value. Alternatively, this may include detecting a power-up and then detecting whether a print count is a predetermined number, such as zero, for example. If the electronic device 100 is already configured, control is terminated; otherwise control is transferred to block 715.

In block 715, the electronic device 100 may prompt the insertion of a configuration sheet 200 by the user. This may be through an appropriate display of text or icons on the user interface 106 or lighting of predetermined indicators (such as LEDs), for example. Alternatively, this may be accomplished by the electronic device 100 printing a configuration request page which requests, in printed form, that the user scan a configuration sheet or sheets. In addition, the user interface 106 may include a configuration/regionalization menu of some manner. The menu enables the user to initiate the configuration process.

In decision block 721, the electronic device 100 detects whether a sheet of paper (or any printed medium) has been inserted into the scanner 111 in response to the prompt. If a sheet is detected, control is transferred to block 731; otherwise, control is transferred to block 724.

In decision block 724, a timeout timer is checked. If the timeout timer has not expired, control is transferred to block 721 and the electronic device 100 waits for insertion of a configuration sheet 200. Otherwise, control is transferred to block 726.

In block 726, in the absence of a scan of a configuration sheet 200, a default configuration action may be taken. This may include, for example, default page sizes, default image printing resolutions, may disable fax operations for legal reasons, etc.

In block 731, the configuration sheet 200 is scanned into the electronic device 100, as previously discussed.

In block 737, configuration symbols are extracted, as previously discussed.

In block 739, the electronic device is configured according to the extracted configuration values, as previously discussed.

In another embodiment, a configuration sheet 200 may be used as part of a diagnostic mode. For example, when an operational problem occurs, the user may call a service center and receive one or more special diagnostic configuration sheets 200. The special diagnostic configuration sheets 200 may be mailed, e-mailed, or faxed to the user. The special diagnostic configuration sheets 200 may be scanned into the electronic device 100 in order to perform diagnostic functions. For example, a special diagnostic configuration sheet 200 may gather information about the problem, and may display or print information to be given to the service center to aid in diagnosis and resolution of the problem. In addition, the special diagnostic configuration sheet 200 may put the electronic device 100 into a troubleshooting mode. In this troubleshooting mode, the special diagnostic configuration sheet 200 may be able to reload predetermined default settings of the electronic device 100. Furthermore, the special diagnostic configuration sheet 200 may be able to modify internal settings and values that the user cannot access and change.

A configuration sheet 200 may be employed in any electronic device 100 that communicates with a scanner 111. The invention therefore does not require excess memory for storing a plurality of configuration data sets. In addition, the invention does not require configuration of the electronic device 100 at the factory, and the invention does not require complex user interaction for the configuration.

The configuration of the electronic device 100 using a configuration sheet 200 provides several benefits. The invention provides an easy and quick configuration process. The selecting and scanning of configuration sheets is much faster than reading a manual and entering configuration settings through a limited-capability user interface. In addition, the invention provides a more natural and user-friendly configuration process than is provided in the prior art. In addition, the configuration sheets can include text that articulates the configuration values and configuration options with greater accuracy than may be achieved on a display panel, due to the lengthy text that may be needed in order to explain each configuration option.

Another benefit is that a configuration sheet comprising a printed medium is very inexpensive and enables a user to easily and quickly add new languages and fonts to the electronic device 100. In addition, the configuration sheets may be easily stored for later use.

Yet another benefit is that the configuration sheet 200 can be created much later in the product development cycle, thus allowing greater flexibility and a shorter design cycle for the electronic device 100. Furthermore, the configuration sheet 200 can be easily revised after products are shipped, and a revised set of configuration sheets 200 may be easily and inexpensively provided to purchasers, such as by fax or by e-mail, for example.

Yet another benefit is that an electronic device 100 may be configured for no region prior to shipping. Then, at a distribution center, a set of appropriate configuration sheets 200 may be included with the electronic device 100. This allows the end user to complete the configuration process, in contrast to the configuration process being performed by a factory or a product distribution center.

Another benefit is that a configuration sheet or sheets may be repeatedly used. For example, the user may have multiple configuration sheet sets and can easily switch between configurations by re-scanning all or part of a configuration sheet set.

Yet another benefit is that the invention enables a simpler user interface that does not need any special capabilities. As a result, fewer buttons or input devices may be needed. For example, there is no need for a numeric keypad (i.e., no need for entry of codes or parameters) and a simpler display may be used (i.e., no need to display text).

Yet another benefit is that the invention enables the user to review a complete set of configuration settings and/or options. As a result, there is no need for multiple menus. Consequently, it is easier for the user to understand and review the configuration process. Furthermore, having a complete listing of configurations and configuration options will make it easier for the user to grasp the capabilities of the electronic device 100, especially if the electronic device 100 performs multiple functions.

Yet another benefit is that the invention enables proper configuration of an electronic device in order to avoid improper or illegal operation of a facsimile device.

Yet another benefit is that the invention enables configuration even in regions where the proper configuration is difficult to determine. For example, for destinations where multiple languages and/or dialects are used, where multiple telephony standards/formats are used, or where multiple legal requirements may be imposed, the distribution center may include all potentially applicable configuration sheet sets. The end user may select the proper set in order to configure the electronic device. This relieves the distribution center of having to determine the proper configuration sheet set and lessens the likelihood of an improper selection of a configuration sheet set.

We claim:

1. An electronic device, comprising:

a scanning means for converting one or more configuration symbols on a printed medium into scan data; and a configuration means for configuring said electronic device with said configuration means receiving said scan data;

wherein said scanning means is capable of scanning a configuration sheet, creating said scan data including said one or more configuration symbols, and wherein said configuration means is capable of extracting said one or more configuration symbols to create one or more corresponding address-independent configuration values and configuring said electronic device with said one or more address-independent configuration values, and wherein as part of the extracting capability said configuration means is capable of identifying a particular configuration sheet of one or more configuration sheets.

2. The electronic device of claim 1, further comprising a user interface capable of accepting user inputs and generating visual outputs.

3. The electronic device of claim 1, further comprising a printer.

4. The electronic device of claim 1, further comprising a copier.

5. The electronic device of claim 1, further comprising a facsimile.

6. The electronic device of claim 1, further comprising a communication interface capable of conducting digital communication.

7. The electronic device of claim 1, wherein said configuration means prompts a user to scan said configuration sheet.

8. The electronic device of claim 1, wherein said configuration sheet comprises a human-readable configuration sheet.

9. The electronic device of claim 1, wherein said one or more configuration symbols comprise encoded configuration information.

10. The electronic device of claim 1, wherein said one or more configuration symbols comprise compressed configuration information.

11. The electronic device of claim 1, with a configuration sheet of said one or more configuration sheets comprising:

a printable medium;

one or more configuration symbols formed on said printable medium;

one or more alignment marks formed on said printable medium; and one or more identification marks that identify a particular configuration sheet of one or more configuration sheets;

wherein a configuration symbol on said printable medium specifies one or more predetermined, address-independent configuration values.

12. The electronic device of claim 11, wherein a location of a configuration symbol on said printable medium specifies one or more predetermined, address-independent configuration values.

13. The electronic device of claim 11, wherein an alignment mark of said one or more alignment marks is formed substantially in a corner region of said configuration sheet.

14. The electronic device of claim 11, wherein an alignment mark of said one or more alignment marks is non-symmetric.

15. The electronic device of claim 11, wherein said one or more identification marks are used to identify a particular configuration sheet of one or more configuration sheets.

16. An electronic device, comprising:

a scanning means for converting one or more configuration symbols on a printed medium into scan data; and a configuration means for configuring said electronic device, with said configuration means receiving said scan data;

wherein said scanning means is capable of auto-detecting a scanned configuration sheet, scanning said configuration sheet, creating said scan data including said one or more configuration symbols, and wherein said configuration means is capable of extracting said one or more configuration symbols to create one or more corresponding address-independent configuration values and configuring said electronic device with said one or more address-independent configuration values.

17. An electronic device, comprising:

a scanner capable of scanning a printed medium and generating scan data including one or more configuration symbols;

a memory including one or more configuration settings, a configuration symbol extraction routine, and a configuration mapping data structure; and a processor communicating with said memory and said scanner and receiving said scan data;

wherein said processor is capable of extracting said one or more configuration symbols using said configuration symbol extraction routine and said configuration mapping data structure in order to create one or more corresponding address-independent configuration values and configuring said electronic device with said one or more address-independent configuration values and wherein as part of the extracting capability said processor is capable of identifying a particular configuration sheet of one or more configuration sheets.

18. The electronic device of claim 17, further comprising a user interface capable of accepting user inputs and generating visual outputs.

19. The electronic device of claim 17, further comprising a printer.

20. The electronic device of claim 17, further comprising a copier.

21. The electronic device of claim 17, further comprising a facsimile.

22. The electronic device of claim 17, further comprising a communication interface capable of conducting digital communication.

23. The electronic device of claim 17, wherein said configuration mapping data structure maps a predetermined configuration symbol to a corresponding predetermined configuration value.

24. The electronic device of claim 17, wherein said configuration mapping data structure comprises a table.

25. The electronic device of claim 17, wherein said configuration means prompts a user to scan said configuration sheet.

26. The electronic device of claim 17, wherein said configuration sheet comprises a human-readable configuration sheet.

27. The electronic device of claim 17, wherein said one or more configuration symbols comprise encoded configuration information.

28. The electronic device of claim 17, wherein said one or more configuration symbols comprise compressed configuration information.

29. The electronic device of claim 17, with a configuration sheet of said one or more configuration sheets comprising:

a printable medium;

one or more configuration symbols formed on said printable medium;

one or more alignment marks formed on said printable medium; and one or more identification marks that identify a particular configuration sheet of one or more configuration sheets;

wherein a configuration symbol on said printable medium specifies one or more predetermined, address-independent configuration values.

30. The electronic device of claim 29, wherein a location of a configuration symbol on said printable medium specifies one or more predetermined, address-independent configuration values.

31. The electronic device of claim 29, wherein an alignment mark of said one or more alignment marks is formed substantially in a corner region of said configuration sheet.

32. The electronic device of claim 29, wherein an alignment mark of said one or more alignment marks is non-symmetric.

33. The electronic device of claim 29, wherein said one or more identification marks are used to identify a particular configuration sheet of one or more configuration sheets.

34. An electronic device, comprising:

a scanner capable of scanning a printed medium and generating scan data including one or more configuration symbols;

a memory including one or more configuration settings, a configuration symbol extraction routine, and a configuration mapping data structure; and a processor communicating with said memory and said scanner and receiving said scan data;

wherein said processor is capable of auto-detecting a scanned configuration sheet, extracting said one or more configuration symbols using said configuration symbol extraction routine and said configuration mapping data structure in order to create one or more corresponding address-independent configuration values and configuring said electronic device with said one or more address-independent configuration values.

35. A configuration method for an electronic device that includes a scanner, comprising the steps of:

identifying a particular configuration sheet of one or more configuration sheets;

scanning said configuration sheet to create scan data including one or more configuration symbols;

extracting said one or more configuration symbols to create one or more corresponding configuration values; and configuring said electronic device with said one or more address-independent configuration values.

36. The method of claim 35, wherein the extracting step further comprises mapping a configuration symbol of said one or more configuration symbols to a configuration value.

37. The method of claim 35, with the extracting step further comprising the steps of:

locating one or more alignment marks on said configuration sheet;

registering said configuration sheet using said one or more alignment marks;

locating one or more identification marks on said configuration sheet; and identifying said configuration sheet as being a particular configuration sheet of said one or more configuration sheets using said one or more identification marks.

38. The method of claim 35, wherein the extracting step further comprises decoding said scan data.

39. The method of claim 35, wherein the extracting step further comprises decompressing said scan data.

40. The method of claim 35, wherein said configuration sheet comprises:

a printable medium;

one or more configuration symbols formed on said printable medium;

one or more alignment marks formed on said printable medium; and one or more identification marks that identify said particular configuration sheet as one of one or more configuration sheets;

wherein a configuration symbol on said printable medium specifies one or more predetermined, address-independent configuration values.

41. The method of claim 40, wherein a location of a configuration symbol on said printable medium specifies one or more predetermined, address-independent configuration values.

42. A configuration method for an electronic device that includes a scanner, comprising the steps of:

scanning a configuration sheet to create scan data including one or more configuration symbols;

extracting said one or more configuration symbols to create one or more corresponding configuration values; and configuring said electronic device with said one or more address-independent configuration values including regionalizing said electronic device, configuring a language of said electronic device, and/or configuring fonts of said electronic device.

43. A configuration method for an electronic device that includes a scanner, comprising the steps of:

determining whether said electronic device is configured;

prompting a scan of one or more configuration sheets if said electronic device is not configured;

scanning a configuration sheet to create scan data including one or more configuration symbols;

extracting said one or more configuration symbols to create one or more corresponding address-independent configuration values; and configuring said electronic device with said one or more address-independent configuration values.

44. The method of claim 43, wherein the determining step further comprises the steps of:

checking a configuration variable; and prompting said scan if said configuration variable contains an unconfigured state value.

45. The method of claim 43, wherein the determining step further comprises the steps of:

detecting a power-up of said electronic device;

checking a configuration state; and prompting said scan if said configuration state contains an unconfigured state value.

46. The method of claim 43, wherein the scanning step auto-detects a scanned configuration sheet.

47. The method of claim 43, wherein the configuring step further comprises regionalizing said electronic device.

48. The method of claim 43, wherein the configuring step further comprises configuring a language of said electronic device.

49. The method of claim 43, wherein the configuring step further comprises configuring fonts of said electronic device.

50. The method of claim 43, wherein the extracting step further comprises mapping a configuration symbol of said one or more configuration symbols to a configuration value.

51. The method of claim 43, with the extracting step further comprising the steps of:

locating one or more alignment marks on said configuration sheet;

registering said configuration sheet using said one or more alignment marks;

locating one or more identification marks on said configuration sheet; and identifying said configuration sheet as being a particular configuration sheet of said one or more configuration sheets using said one or more identification marks.

52. The method of claim 43, wherein the extracting step further comprises decoding said scan data.

53. The method of claim 43, wherein the extracting step further comprises decompressing said scan data.

54. The method of claim 43, wherein said configuration sheet comprises:

a printable medium;

one or more configuration symbols formed on said printable medium;

one or more alignment marks formed on said printable medium; and one or more identification marks that identify a particular configuration sheet of one or more configuration sheets;

wherein a configuration symbol on said printable medium specifies one or more predetermined, address-independent configuration values.

55. The method of claim 54, wherein a location of said configuration symbol on said printable medium specifies one or more predetermined, address-independent configuration values.

56. A configuration method for an electronic device that includes a scanner, comprising the steps of:

scanning a configuration sheet to create scan data including one or more configuration symbols;

auto-detecting said scanned configuration sheet;

extracting said one or more configuration symbols to create one or more corresponding configuration values; and configuring said electronic device with said one or more address-independent configuration values.

* * * * *

UNITED STATES PATENT AND TRADEMARK OFFICE

CERTIFICATE OF CORRECTION

PATENT NO. : 7,003,657 B2
APPLICATION NO. : 10/177464
DATED : February 21, 2006
INVENTOR(S) : Marvin Duane Nelson et al.

It is certified that error appears in the above-identified patent and that said Letters Patent is hereby corrected as shown below:

In column 9, line 54, in Claim 1, after “device” insert --,--.

In column 11, line 16, in Claim 17, after “values” insert --,--.

Signed and Sealed this

Twenty-sixth Day of May, 2009

John Doll

JOHN DOLL
*Acting Director of the United States Patent and Trademark Office*